United States Patent
Tang et al.

(10) Patent No.: US 11,483,027 B2
(45) Date of Patent: Oct. 25, 2022

(54) SUB-THERMAL SPREAD SPECTRUM DATA-LINK

(71) Applicant: California Institute of Technology, Pasadena, CA (US)

(72) Inventors: Adrian J. Tang, Pasadena, CA (US); Mau-Chung Frank Chang, Los Angeles, CA (US); Rulin Huang, Los Angeles, CA (US)

(73) Assignees: CALIFORNIA INSTITUTE OF TECHNOLOGY, Pasadena, CA (US); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 17/127,017

(22) Filed: Dec. 18, 2020

(65) Prior Publication Data
US 2021/0194535 A1  Jun. 24, 2021

Related U.S. Application Data

(60) Provisional application No. 62/952,991, filed on Dec. 23, 2019.

(51) Int. Cl.
*H04B 1/707* (2011.01)
*H04B 1/712* (2011.01)
(Continued)

(52) U.S. Cl.
CPC ............. *H04B 1/712* (2013.01); *H04B 1/709* (2013.01); *H04B 1/7087* (2013.01); *H04B 1/7117* (2013.01)

(58) Field of Classification Search
CPC ...... H04B 1/712; H04B 1/7087; H04B 1/709; H04B 1/7117; H04B 1/708
(Continued)

(56) References Cited

U.S. PATENT DOCUMENTS 5,465,097 A * 11/1995 Fry ........................... G01S 3/46
                                                          342/442
2005/0238149 A1* 10/2005 De Leon ................ G06Q 20/32
                                                          379/93.12
(Continued)

OTHER PUBLICATIONS

Kim, Y., et al., "A Millimeter-Wave CMOS Transceiver With Digitally Pre-Distorted PAM-4 Modulation for Contactless Communications", IEEE Journal of Solid-State Circuits, Jun. 2019, pp. 1600-1612, vol. 54, No. 6.
(Continued)

*Primary Examiner* — Don N Vo
(74) *Attorney, Agent, or Firm* — Gates & Cooper LLP (57) ABSTRACT

We have demonstrated that the bandwidth millimeter wavelengths offer can be leveraged to deeply spread a low-data rate signal below the thermal floor of the environment (sub-thermal) by lowered transmit power combined with free space losses, while still being successfully received through a novel dispreading structure which does not rely on pre-detection to extract timing information. The demonstrated data link ensures that it cannot be detected beyond a designed range from the transmitter, while still providing reliable communication. A demonstration chipset of this sub-thermal concept was implemented in a 28 nm CMOS technology and when combined with an InP receiver was shown to decode signals up to 30 dB below the thermal noise floor by spreading a 9600 bps signal over 1 GHz of RF bandwidth from 93 to 94 GHz using a 64 bit spreading code. The transmitter for this chipset consumed 62 mW while the receiver consumed 281 mw.

20 Claims, 9 Drawing Sheets

(51) Int. Cl.
  *H04B 1/709* (2011.01)
  *H04B 1/7087* (2011.01)
  *H04B 1/7117* (2011.01)

(58) Field of Classification Search
  USPC ........................................................ 375/150
  See application file for complete search history.

(56) References Cited

U.S. PATENT DOCUMENTS

| | | | | |
|---|---|---|---|---|
| 2010/0280956 | A1* | 11/2010 | Chutorash | G06Q 20/20 |
| | | | | 705/64 |
| 2013/0210353 | A1* | 8/2013 | Ling | H04W 4/80 |
| | | | | 455/41.1 |
| 2017/0317712 | A1* | 11/2017 | Graceffo | H04B 1/707 |
| 2019/0173518 | A1* | 6/2019 | Ataie | H04B 1/7085 |
| 2021/0203430 | A1* | 7/2021 | Sorimachi | H04J 13/10 |

OTHER PUBLICATIONS

Kodak, U., et al., "A 5G 28-GHz Common-Leg T/R Front-End in 45-nm CMOS SOI With 3.7-dB NF and -30-dBc EVM With 64-QAM/500-MBaud Modulation", IEEE Transactions on Microwave Theory and Techniques, Jan. 2019, pp. 318-331, vol. 67, No. 1.

Wu, R., et al., "64-QAM 60-GHz CMOS Transceivers for IEEE 802.11ad/ay", IEEE Journal of Solid-State Circuits, Nov. 2017, pp. 2871-2891, vol. 52, No. 11.

Nemchick, D.J., et al., "Sub-Doppler SpectroscopyWith a CMOS Transmitter", IEEE Transactions on Terahertz Science and Technology, Jan. 2018, pp. 121-126, vol. 8, No. 1.

Nemchick, D.J., et al., "A CMOS-Based 90—105 GHz Pulsed-Echo Spectrometer: New Approaches for Highly-Mobile and Low-Power in situ Chemical Detections", IEEE International Symposium on Space Terahertz Technology (ISSTT), Mar. 2018, pp. 75.

Tang, A., et al., "A 177-205 GHz 249mWCMOS-Based Integer-N Frequency Synthesizer Module for Planetary Exploration", IEEE Transactions on Terahertz Science and Technology, Mar. 2018, pp. 251-254, vol. 8, No. 2.

Tang, A., et al., "A W-Band 65nm CMOS/InP-Hybrid Radiometer & Passive Imager", International Microwave Symposium, 2016, pp. 1-3.

Torrieri, D., "Principles of Spread-Spectrum Communication Systems", Springer, 2015 ISBN 978-3-319-14095-7, pp. 1-650.

\* cited by examiner

SUB-THERMAL SPREAD SPECTRUM DATA-LINK

CROSS REFERENCE TO RELATED APPLICATIONS

This application claims the benefit under 35 U.S.C. Section 119(e) of co-pending and commonly-assigned U.S. provisional patent application Ser. No. 62/952,991, filed on Dec. 23, 2019, by Adrian J. Tang, Mau-Chung Frank Chang, and Rulin Huang entitled "Sub-Thermal Spread Spectrum Data-Link," client reference CIT-8415-P, which application is incorporated by reference herein.

STATEMENT REGARDING FEDERALLY SPONSORED RESEARCH AND DEVELOPMENT

This invention was made with government support under Grant No. 80NM0018D004 awarded by NASA (JPL). The government has certain rights in the invention.

BACKGROUND OF THE INVENTION

1. Field of the Invention

The present invention relates to systems and methods of communication.

2. Description of the Related Art

While silicon-based millimeter-wave datalinks have become mature over the last decade with established standards like 802.11.ad (wiGiG) and emerging 5G standards up to E-band the focus has remained on leveraging mm-wave systems for their wide channel bandwidths, allowing for high data rates to be achieved with many demonstrations employing both simple[1,2] and complex [3,4] modulations.

SUMMARY OF THE INVENTION

The present disclosure discloses a communication system capable of leveraging wide mm-wave channel bandwidths for security and concealment purposes. The system can be embodied in many ways including, but not limited to, the following.

1. A receiver, comprising:
an antenna receiving carrier electromagnetic radiation transmitted from a transmitter;
a demodulator demodulating the carrier electromagnetic radiation to obtain a demodulated signal comprising a spread signal combined with thermal noise, the thermal noise having a thermal noise power spectral density (PSD), the spread signal formed from a signal using a spreading sequence applied to the signal in the transmitter, and the spreading sequence spreading a signal bandwidth of the signal to form the spread signal having a spread PSD smaller than the thermal noise PSD for all frequencies in the spread signal; and
de-spreading circuitry:
comparing the demodulated signal with a plurality of de-spreading sequences representing different timings of the spreading sequence with respect to the demodulated signal, to find or obtain a correlated signal comprising a correlation between the demodulated signal and one of the de-spreading sequences; and
outputting the correlated signal as the signal having a signal PSD greater than the thermal noise PSD.

2. The receiver of example 1, wherein the receiver selects/generates the different timings of de-spreading sequences and selects the correlated signal as the signal without a detection of the signal prior to input of the demodulated signal to the de-spreading circuitry or prior to the demodulating in the demodulator. For example, the receiver does not perform phase-locking on the incoming signal and/or use training preamble sequences to establish timing at the receiver since there is no detectable timing or sequence to "lock" onto because the received signal has a PSD below the thermal noise PSD.

3. The receiver of example 1 or 2, wherein:
the de-spreading circuitry compares all of the plurality of de-spreading sequences with the demodulated signal in parallel and/or simultaneously, and
the different timings are selected from a set of, or include, every possible time alignment/time synchronization of the spreading sequence with respect to the demodulated signal such that the de-spreading circuitry selects the correlated signal as the signal without estimating or inferring the timings from a detection of the signal prior to the comparing.

4. The receiver of any of the examples 1-3, wherein the spreading sequence comprises a plurality of chips (a pulse or bit "0" or bit "1") forming a direct-sequence spread spectrum (DSSS) code used in direct-sequence code division multiple access (CDMA) channel access techniques and the signal is an NRZ signal.

5. The receiver of any of the examples 1-4, wherein:
the de-spreading circuitry compares all of the plurality of de-spreading sequences with the demodulated signal in parallel,
the spreading sequence and the de-spreading sequences each comprise a sequence of n elements, where n is an integer,
the de-spreading sequences comprise all n of the possible cyclic permutations of the elements of the spreading sequence by an offset wherein the elements shifted off an end of the sequence are inserted back at a beginning of the sequence, and
the plurality of de-spreading sequences comprise a set of n de-spreading sequences such that $i^{th}$ de-spreading sequence in the plurality of de-spreading sequences is the cyclic permutation of the spreading sequence by the offset comprising i elements, where $0 \le i \le n$. For a spreading sequence with elements $\{X_1, X_2, X_3, \ldots X_n\}$, a cyclic permutation of one place to the left would yield $\{X2, X3, \ldots Xn, X1\}$ and a cyclic permutation of one place to the right would yield $\{Xn, X1, X2 \ldots X_{n-1}\}$. The mapping can be written as $X_i \rightarrow X_{i+k}$ (mod n) for a shift (or rotation) of k places.

6. The receiver of any of the examples 1-5, wherein the de-spreading circuit:
multiplies the demodulated signal by each of the de-spreading sequences in parallel to form a plurality of outputs, and
adds the outputs to form a summed output comprising the correlated signal.

7. The receiver of any of the examples 1-6, wherein the de-spreading circuit comprises a plurality of analog mixers connected in parallel, each of them mixers multiplying the de-modulated signal comprising an analog signal with a different one of the de-spreading sequences to form the outputs.

8. The receiver of any of the examples 1-7, wherein the spread PSD has a magnitude smaller than (and the signal PSD has a magnitude greater than) the thermal noise measured/detected in the transmitter, the receiver, in any transmission path between the transmitter and the receiver, or by any unintended eavesdropper, for all frequencies in the signal and the spread signal.

9. The receiver of any of the examples 1-8, wherein the demodulator demodulates the carrier electromagnetic radiation received on the antenna using homodyne detection (e.g., direct converter, non-coherent detection) obtaining amplitude of the demodulated signal but losing phase information of demodulated signal and the comparing compares only compares amplitude (not phase) of the demodulated signal with the different timings of the despreading sequences.

10. The receiver of any of the examples 1-9, wherein the carrier electromagnetic radiation comprises millimetre wave electromagnetic radiation having a frequency of at least 30 gigahertz.

11. A communication system comprising the receiver of any of the examples 1-10 and the transmitter transmitting the carrier electromagnetic radiation to the receiver, the transmitter further comprising:

a spreading modulator modulating the signal with the spreading sequence to form the spread signal; and a carrier modulator modulating a carrier with the spread signal to form the carrier electromagnetic radiation.

12. The receiver of any of the examples 1-11, wherein the signal bandwidth is less than 100 KHz and the spread bandwidth is at least 1 GHz.

13. The receiver of any of the examples 1-12, wherein the factor by which the signal bandwidth is spread to form the spread bandwidth is proportional to the data rate of the signal (the data rate is proportional to the spread of the signal bandwidth).

14. The receiver of any of the examples 1-13, wherein the signal comprises a message having a data rate up to 100000 bits per second.

15. The receiver of any of the examples 1-14, further comprising the transmitter including an amplifier amplifying at least one of the spread signal or the carrier electromagnetic radiation by a factor (e.g., amplifying the carrier electromagnetic radiation to watt level powers) sufficient to support transmission of the data rate between 10000 bits per second and 100000 bits per second to the receiver and so that the de-spreading circuitry obtains the correlated signal comprising the message.

16. The receiver of any of the examples 1-15, wherein the carrier electromagnetic radiation is transmitted wirelessly over a distance of at least 2 meters between the transmitter and the receiver.

17. The system of any of the examples 1-16, comprising a cryptographic system wherein the signal comprises a message, the spreading sequence comprises a key encrypting the message, and the spread signal comprises an encrypted message.

18. The system of example 17, wherein the transmitter transmits the key to (or shares the key with) the receiver and the encrypted message cannot be decrypted by the receiver or an eavesdropper without the key.

19. The system of any of the examples 1-18, wherein the system comprises a wireless payment system and the message signal comprises payment information including a bank account number.

20. The system of any of the examples 1-19, wherein the system comprises a text messaging system and the signal comprising the message comprises a text message.

21. An integrated circuit or chip, comprising:

an input configured to receive a noisy signal comprising a spread signal combined with thermal noise, the thermal noise having a thermal noise power spectral density (PSD), the spread signal formed from a signal having a signal PSD greater than the thermal noise PSD using a spreading sequence applied to the signal, and the spreading sequence spreading a signal bandwidth of the signal to form the spread signal having a spread PSD smaller than the thermal noise PSD for all frequencies in the spread signal; and de-spreading circuitry comparing the demodulated signal with a plurality of de-spreading sequences, wherein:

the spreading sequence and the de-spreading sequences each comprise a sequence of n elements, where n is an integer, the de-spreading sequences comprise all n of the possible cyclic permutations of the elements of the spreading sequence by an offset wherein the elements shifted off an end of the sequence are inserted back at a beginning of the sequence, and the plurality of de-spreading sequences comprise a set of n de-spreading sequences such that $i^{th}$ de-spreading sequence in the plurality of de-spreading sequences is a cyclic permutation of the spreading sequence by the offset comprising i elements, where $0 \leq i \leq n$.

22. The integrated circuit of example 21, wherein the comparing comprises:

multiplying the noisy signal by each of the de-spreading sequences to form a plurality of outputs, and adding the outputs to form a summed output comprising the correlated signal.

23. The integrated circuit of example 21 or 22, wherein the de-spreading circuit comprises a plurality of analog mixers connected in parallel, each of them mixers multiplying the noisy signal comprising an analog signal with a different one of the de-spreading sequences to form the outputs.

In one example demonstration, we took a 9600 bit per second (bps) data signal that normally occupies (9.6 KHz) and spread it across 1 GHz bandwidth, reducing the power density by a factor of 104166× (or approximately 50 dB in a logarithmic scale). This signal was then up-converted to 94 GHz (a millimeter wavelength) and broadcast 1-2 meters using a transmit a power level where the signal power density is below the environment's thermal noise density beyond 1 meter of transmission distance. These selected distances are specific to the demonstration, and not required to be any given value by the invention itself. The invention can be configured so that the signal density falls below the thermal noise at any designed distance through manipulation of the antenna gain, transmit power, and manipulation of absorption during propagation. In the demonstration the signal was shown to be undetectable by the receiver (as it is below the noise floor) at this 1 meter distance. It also showed that once the de-spreading process with the above described cyclic de-spreader was applied, the signal again becomes visible and data or message contents accessible.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized, and structural changes may be made without departing from the scope of the present invention.

Technical Description

Figure 1A:
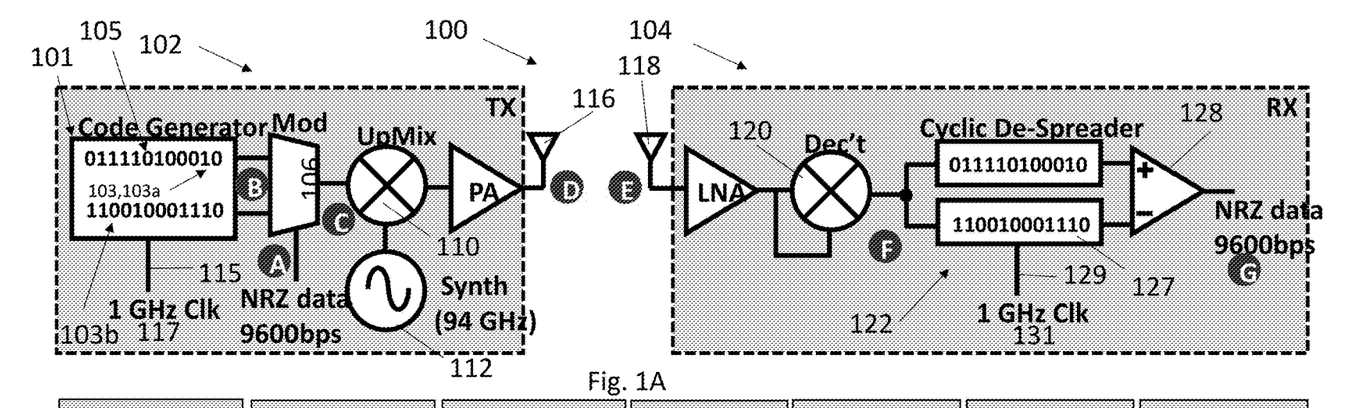
FIG. 1A illustrates a communication link comprising a transmitter and a receiver and FIG. 1B is a block diagram of the sub-thermally received datalink showing time domain and frequency domain signals at key points A-G identified throughout the communication link in FIG. 1A.
Figure 1B:
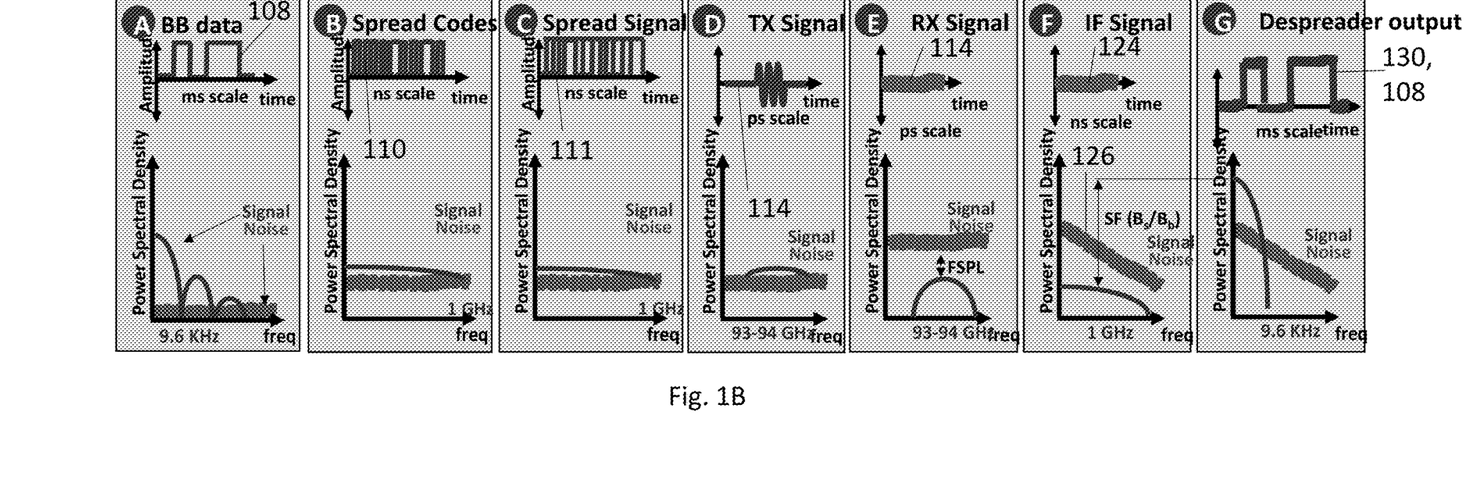

FIGS. 1A and 1B illustrate a communication system 100 including a transmitter 102 (Tx) and a receiver 104 (Rx). The transmitter includes a code generator 101 generating a spreading sequence 103 and a first modulator 106 modulating the signal 108 (comprising a message or base band data, BB data having a signal bandwidth) with the spreading sequence 103 to form the spread signal 111. In one or more examples, the spreading sequence 103 comprises a sequence of n elements 105 that repeats (or wraps around itself), and the spreading sequence includes two spreading sequences 103a, 103b (one sequence for modulating the "1" bits in the signal and the other sequence for modulating the "0" bits in the signal). The first modulator 106 applies the spreading sequence 103 to the signal 108 using a timing 115 (e.g., determined by a clock signal 117).

The transmitter further includes a second modulator or mixer 110 modulating a carrier 112 with the spread signal 111 to form the carrier electromagnetic radiation 114. The transmitter 102 further includes a power amplifier (PA) amplifying the carrier electromagnetic radiation 114 and an antenna 116 transmitting the amplified carrier electromagnetic radiation off the transmitter to the receiver 104.

The signal has a signal bandwidth such that the signal's power spectral density (PSD) is greater than the thermal noise PSD for all frequencies in the signal. The first modulator applies the spreading sequence 103 to the signal 108 so that the spreading sequence spreads the signal bandwidth to form the spread signal having a spread bandwidth and a spread PSD smaller than the thermal noise PSD for all frequencies in the spread signal. In various examples, the carrier 112 comprises millimetre wave electromagnetic radiation having a frequency of at least 30 gigahertz, the spread PSD has a magnitude smaller than (and the signal PSD has a magnitude greater than) the thermal noise measured/detected in the transmitter, the receiver, in any transmission path between the transmitter and the receiver, or by any unintended eavesdropper, for all frequencies in the signal or spread signal.

FIG. 1A further illustrates the receiver 104 includes a receiver antenna 118 receiving the carrier electromagnetic radiation 114 transmitted from the transmitter; a low noise amplifier (LNA) amplifying the received carrier electromagnetic radiation; a demodulator 120 (e.g., decoherent downconverter mixer); and de-spreading circuitry 122. The demodulator demodulates the carrier electromagnetic radiation to obtain a demodulated signal 124 comprising the spread signal combined with thermal noise 126 having the thermal noise PSD. The de-spreading circuitry (e.g., comprising a comparator 128 or correlator) compares the demodulated signal with a plurality of de-spreading sequences 127 representing different timings of the spreading sequence with respect to the demodulated signal, to find a correlated signal 130 comprising a correlation between the demodulated signal and one of the de-spreading sequences. In various examples, the different timings are selected from a set of, or include, every possible time alignment of the spreading sequence with respect to the demodulated signal so that the de-spreading circuitry can select the correlated signal as the signal without estimating or inferring the timings from a detection of the signal prior to receipt of the demodulated signal in the de-spreading circuitry. The correlated signal is obtained for one of the different timings of the demodulated signal relative to the de-spreading sequence that is equivalent to (or corresponds to or matches) the timing used when applying the spreading signal to the signal in the transmitter, so that the correlated signal comprises the signal and the message can be read from the signal. The despreading sequences can be applied to the demodulating signal using a timing 129 provided by a clock signal 131 in the receiver (which may not be synchronized to the clock signal 117 in the transmitter).

The de-spreading circuit then outputs and/or selects the correlated signal as the signal.

Example Implementation

Figure 2:
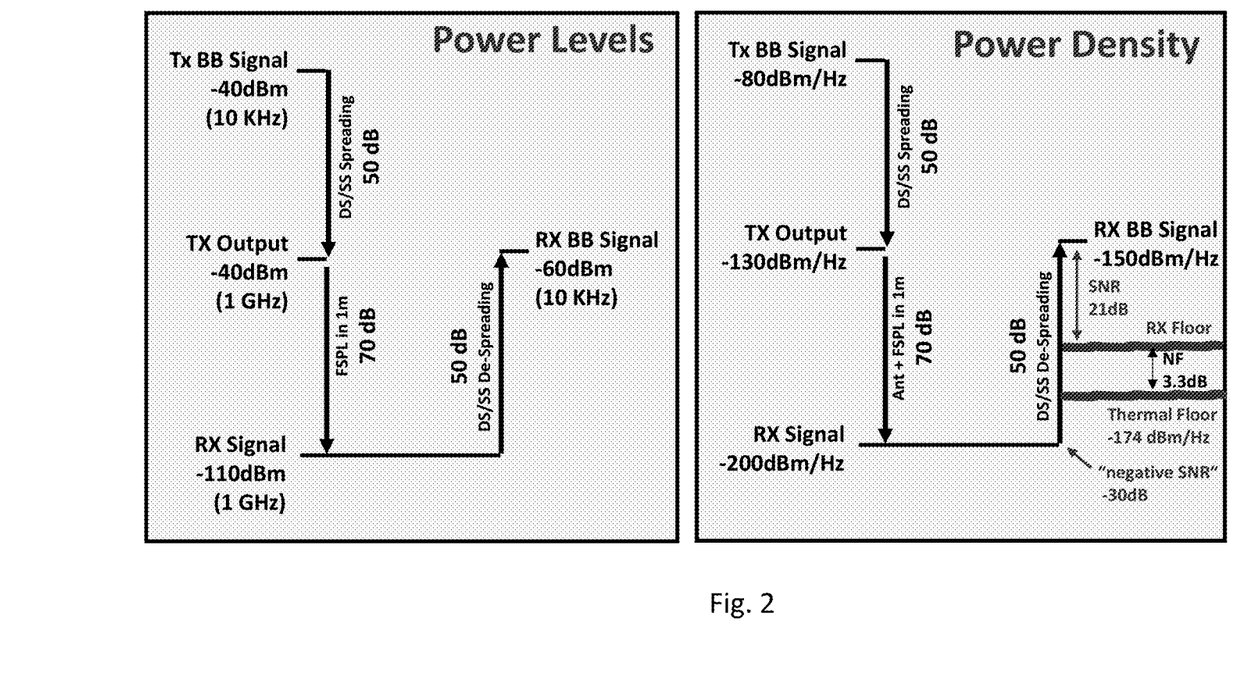
FIG. 2. Graphic depiction of power level and power density levels for the sub-thermally received datalink.

FIG. 1B shows the block diagram our developed CMOS 94 GHz datalink chipset highlighting signals at key nodes in the system where an extremely low-data rate (9600 bps) non-return to zero (NRZ) signal is spread with a direct-sequence spread-spectrum (DS/SS) process by a digital code generator to a bandwidth of 1 GHz. This extremely large spreading factor (SF) results in a reduction of the signals power spectral density (PSD) by 1 GHz/9 KHz or approximately 50 dB as signal power originally spread over 9 KHz is now spread over 1 GHz. The signal is then up-converted and transmitted with a weak output power level of −40 dBm at the 94 GHz carrier wavelengths. The combination of low output power and free space loss causes the signal's PSD to fall below the PSD of the environmental thermal noise (−174 dBm/Hz at room temperature) after a few meters of propagation. At the receiver input the PSD of the spread signal is well below the thermal floor (approximately 30 dB in our case), rendering it essentially invisible to instrumentation with short timescales of observation. In order to non-coherently detect the presence of the spread signal, an ideal non-coherent detector would be required to average for 1M seconds as noise power is reduced with $\sqrt{t}$ and needs to increase SNR by 30 dB to achieve unity. At the receiver IF, dispreading occurs restoring the 9 KHz narrowband signal (along with collected noise) increasing the captured SNR by the spreading factor, allowing for reception with a near 20 dB SNR. FIG. 2 graphically depicts the spread and unspread transmit power levels and power spectral densities. Overall this system demonstrates that by spreading low-data rate signals overlarge mm-wave bandwidths, and limiting communication time, these signals can be rendered undetectable by any instrumentation present within the environment placed beyond a designed range from the transmitter.

The mm-wave transceiver circuitry employed for this datalink demonstration is taken from the transmitter and receiver presented in [5,6] where the detailed RF performance of each is reported. Simple modifications to the transmitter were made to apply the modulation and to reduce the output power levels from 0 dBm to the −40 dBm transmit powers employed here by removing the power amplifier at the end of the transmitter chain.

a. Spread/De-Spread Engine (i) Spreading circuitry: Spreading of the baseband NRZ is accomplished by applying two spreading sequences (comprising high-speed 1 Gb/s digital spreading codes) to a multiplexer and then using the NRZ signal to select which code is transmitted (so one code represents a "1" symbol while the other represents the "0" symbol). These two spreading codes are 64 bits long, and generated by a linear shift register PRBS generator which wraps around in a repeated fashion. This is similar to the architecture used in a conventional DS/SS datalink.

(ii) De-Spreading Circuitry: The major challenge of the sub-thermally received datalink lies in the de-spreading process. The timing of the arriving signal is unknown, and so temporal alignment with the de-spreading code (required for de-spreading operation) is also unknown. In traditional DS/SS data links, phase-locking on the incoming data and the use of training preamble sequences is used to establish timing at the receiver, however none of these are applicable to a sub-thermal link, as there is no detectable timing or sequence to "lock" onto as the received signal lies below the thermal floor by design. Instead we propose a structure we call a "cyclic despreader" with the block diagram shown in FIG. 3.

Figure 3:
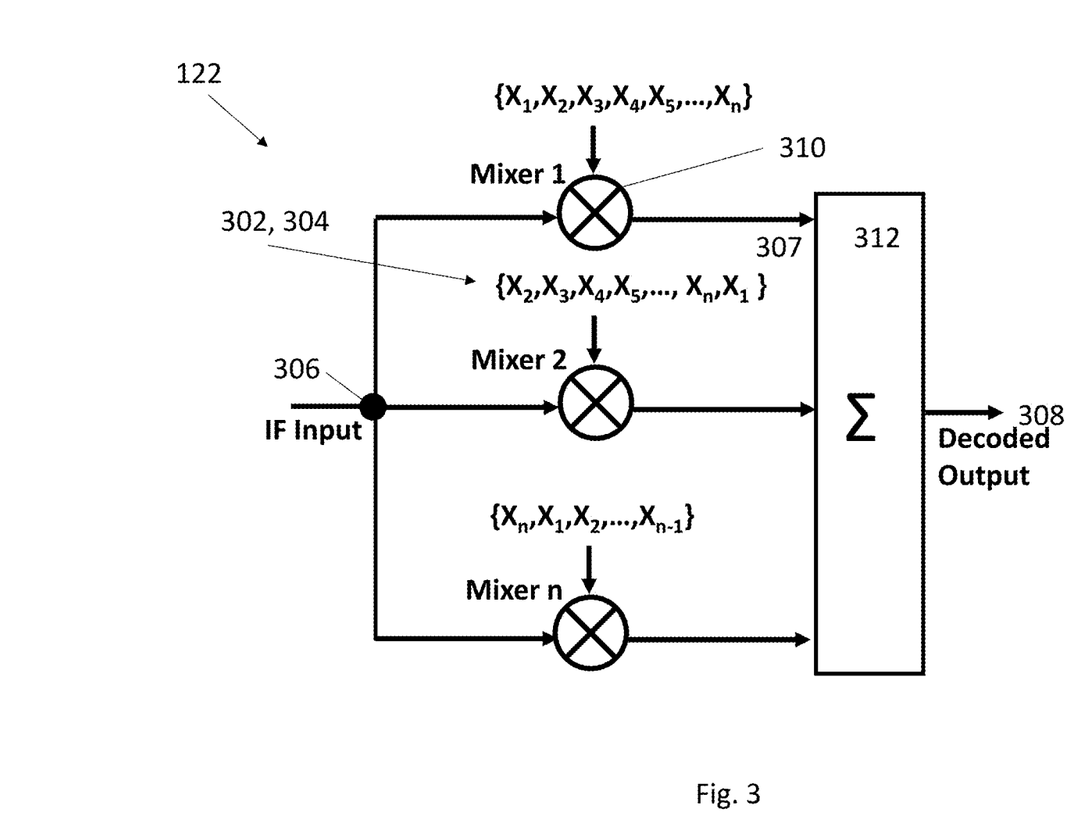
FIG. 3. Cyclic de-spreader which can despread a DS/SS signal below the thermal floor as it requires no pre-detection knowledge of the incoming signal. The despreading code is {X1, ..., Xn} with n=64 in our prototype demonstration.

FIG. 3 illustrates the de-spreading circuitry 300, wherein de-spreading sequences 302 each comprise a sequence of n elements $X_n$, where n is an integer and the de-spreading sequences comprise all n of the possible cyclic permutations of then elements 105 of the spreading sequence 103 by an offset wherein the elements shifted off an end of the sequence are inserted back at a beginning of the sequence. In this way, the plurality of de-spreading sequences comprise a set of n de-spreading sequences wherein the $i^{th}$ de-spreading sequence 304 in the plurality of de-spreading sequences is a cyclic permutation of the spreading sequence by the offset comprising i elements, where $0 \leq i \leq n$. The despreading circuitry includes an input 306, and an output 308.

Thus, the cyclic despreader is essentially a correlator which compares the incoming receiver IF signal with every possible time alignment of the spreading code in parallel. While traditionally de-spreading operations are performed in the digital domain, the high bandwidth of the spread signal (in this case 1 GHz) would require extremely high sample rates for the analog to digital converter (ADC) and digital signal processing (DSP) circuitry, so instead we rely on analog Gilbert cell mixers 310 to perform the multiplication operation within the de-spreader circuitry. At any given time, exactly 1 of the parallel paths will be fully correlated, outputting a decoded signal while the remaining n−1 paths will be uncorrelated (as they are misaligned in time) outputting zero. The output of all the analog mixers are summed (e.g., in an adder 312) resulting in a global output 308 that will always have a decoded signal, although it is provided by different individual de-spreading paths at different times as the time alignment slowly drifts between the received signal and local clock 131. The result is a de-spreading unit that does not depend on pre-detection of timing characteristics within the input signal.

b. Measurements and Results

Figure 4:
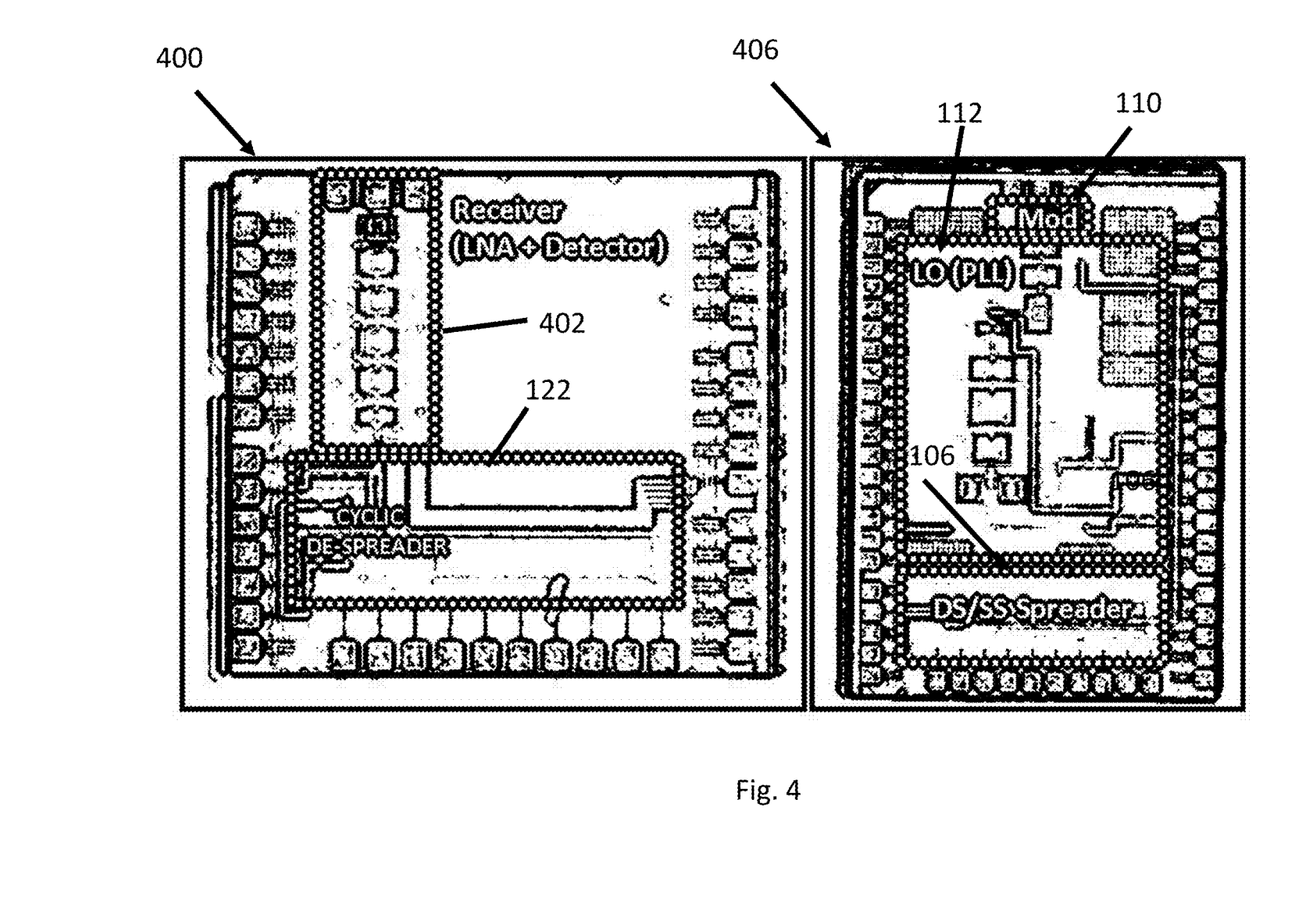
FIG. 4. Die photos of the sub-thermal transmitter and receiver chip showing key circuit blocks.
Figure 5:
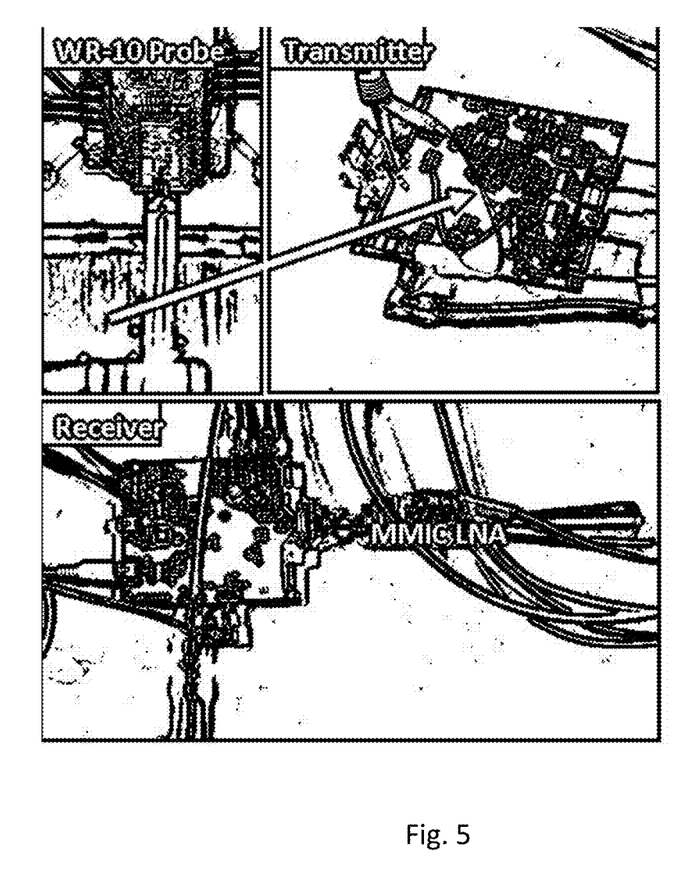
FIG. 5. Assembly of the sub-thermal receiver and transmitter board showing micro-assembly with WR-10 waveguide coupler [7] and external LNA [8].

In order to demonstrate and characterize the sub-thermal link concept we developed a chipset using existing designs for a 94 GHz mm-wave transceiver and added the spreading and cyclic-de-spreading circuitry. These chips were then bonded onto a PCB with a WR-10 waveguide coupler interface similar to the ones presented in [7]. Illustrations of the chip assembly and boards are shown in FIGS. 4 and 5. FIG. 4 illustrates the receiver 104 comprises a chip 400 including the de-spreading circuitry 122 and the receiving circuitry 402 (LNA and detector (e.g., antenna), and demodulator), and the transmitter 102 includes a chip 406 comprising the modulator 110, the synthesizer 112 comprising a local oscillator (LO) and phase locked loop PLL; and DSS/SS spreader 106. For the receiver we use an external W-band LNA implemented in an InP HEMT technology as the noise performance offered is better than what is achievable in silicon. The detailed performance of this LNA is reported in [8], which offers a Tsys of approximately 500K DSB. For the receiver we included a 20 dBi W-band horn antenna, while for the transmitter we only used the open-ended waveguide as a radiator without an explicit antenna. As we wish to transmit very low powers to ensure we are sub-thermal after a few meters of propagation, a high gain antenna is not needed or desired.

Figure 6:
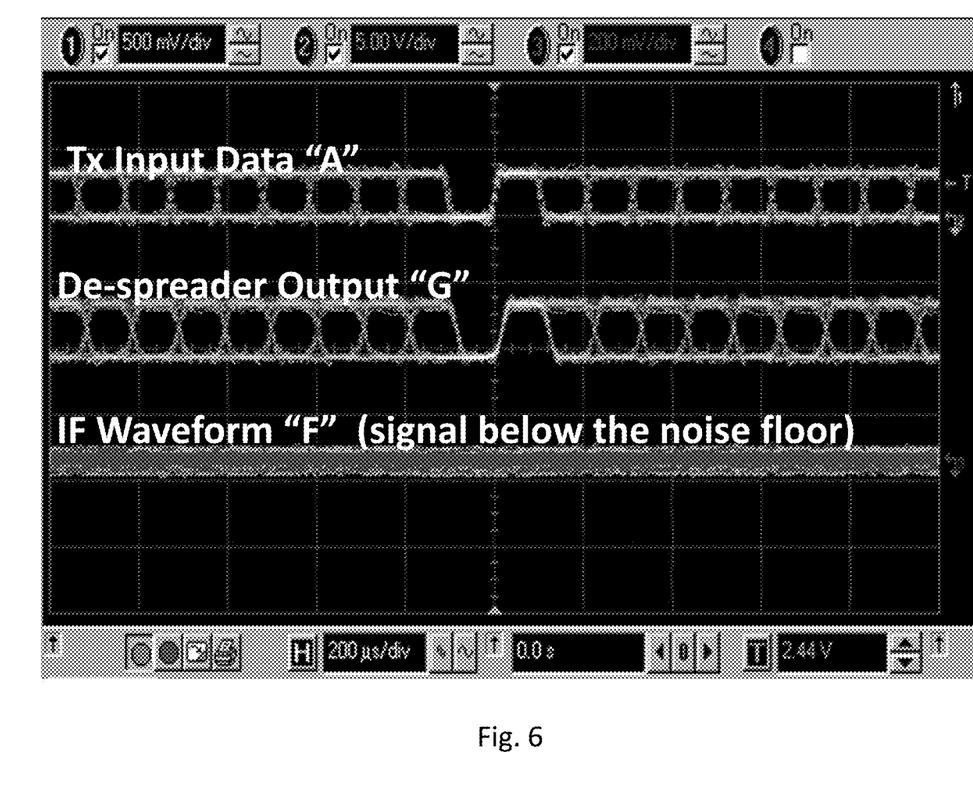
FIG. 6. Time domain measurements of the sub-thermal data link showing input and de-spread waveforms as well as the IF waveform which appears as noise since the signal density is 30 dB below the noise density.

To first characterize the datalink we streamed 9600 bps serial data into the transmitter using a simple USB to serial converter, while monitoring both the receiver intermediate frequency (IF) and de-spreaded output in the time domain. These measurements are shown in FIG. 6. The eye diagram at the receiver is well defined, despite the IF signal having no detectable content (expected as the spread signal is below the thermal floor). By streaming several large text files and counting the errors we estimate the link achieves a bit error rate (BER) of better than 1e-8 (limited by the file size we can send at 9600 bps in a reasonable test time).

Figure 7:
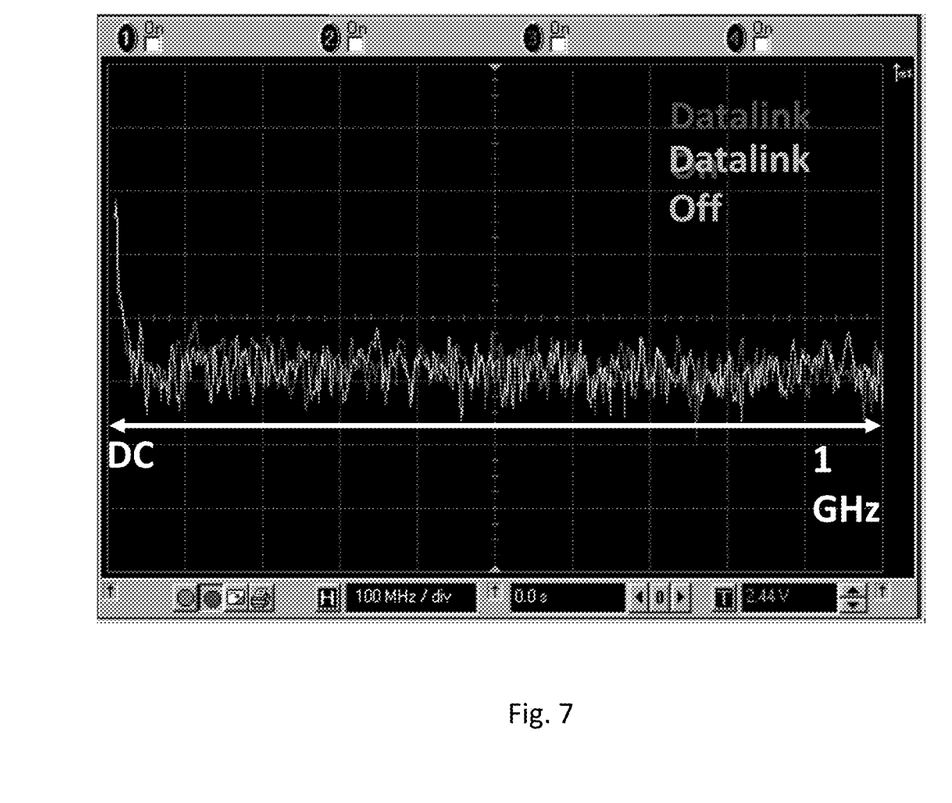
FIG. 7. Spectrum of the receiver IF from DC to 1 GHz averaged for 10 minutes with the spread signal present and absent showing that the received signal is well below the thermal noise floor.

Second, to ensure that the link really is providing sub-thermal operation, we connected a spectrum analyzer to the IF of the receiver with a long averaging time of 10 minutes, observing from DC to 1 GHz (the frequency span the spread signal occupies at the receiver IF) both with the transmitter active and transmitting, as well as fully powered down. This result is shown in FIG. 7 where the noise spectrum of the receiver IF appears identical both with the transmitter on and transmitter off. As seen in the measurement there are no spectral artifacts or frequency components that reveal the presence of the transmitted signal in the receiver IF. Another receiver operating in the same band at a similar distance from the transmitter would also capture a similar IF spectrum, being unable to detect that a communication link is present.

Higher data rates can be achieved, and the signals can be amplified (e.g., to watt levels) using available amplification techniques and equipment so that longer transmissions can be achieved, or more data can be transmitted for the same distance.

Process Steps

Method of Fabrication

Figure 8:
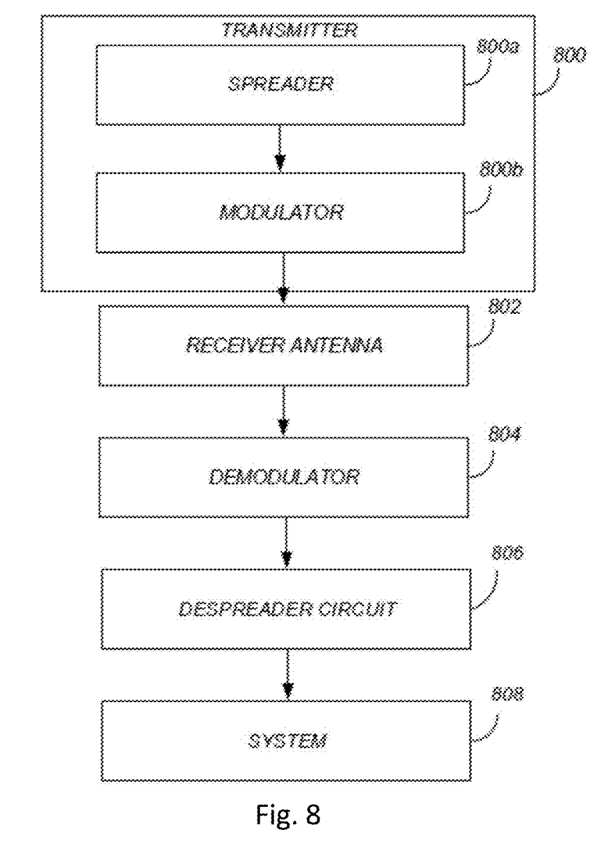
FIG. 8. Flowchart illustrating a method of making a chipset and datalink.

FIG. 8 is a flowchart illustrating a method of making a receiver and a communication system (e.g., a data-link). The method can include one or more of the following steps.

Block 800 represents optionally fabricating and/or providing a transmitter comprising a spreader modulator (Block 800a) connected to a carrier modulator (mixer). As described herein, the spreader modulator receives a signal having a signal PSD greater than the thermal noise PSD (as received, measured, or detected in the receiver) and modulating the signal with one or more spreading sequence(s) to spread the signal's bandwidth so that the spread signal has a spread bandwidth wherein the spread signal has a PSD greater than the thermal noise PSD (as received, measured, or detected in the receiver). The carrier modulator (Block 800b) is configured to modulate a carrier with the spread signal.

Blocks 802-806 represent fabricating a receiver.

Block 802 represents obtaining an antenna receiving carrier electromagnetic radiation transmitted from the transmitter.

Block 804 represents obtaining or fabricating a demodulator and connecting the demodulator to the antenna. The demodulator is configured to demodulate the carrier electromagnetic radiation to obtain a demodulated signal comprising the spread signal combined with the thermal noise (as defined herein, thermal noise is noise proportional to kT, where k is Boltzmann's constant and T is temperature). In one or more examples, the de-modulator is a homodyne detector (direct down converter) or self mixer mixing the carrier electromagnetic radiation with an LO having the same or similar frequency as the carrier 112.

Block 806 represents fabricating de-spreading circuitry and/or connecting de-spreading circuitry, e.g., to the demodulator. The de-spreading circuitry includes an input for receiving the demodulated signal. The de-spreading circuitry can include a de-spreading sequence generator generating a plurality of de-spreading sequences (de-coding sequences) representing different timings of the spreading sequence (coding sequence) with respect to the demodulated signal. The de-spreading circuitry (e.g., implemented with transistors and comprising a comparator or correlator) is further configured to compare the demodulated signal with the plurality of de-spreading sequences to find a correlated signal comprising a correlation between the demodulated signal and one of the de-spreading sequences (thereby decoding the signal from the spread signal). The de-spreading circuitry selects or outputs the correlated signal as the signal and/or has an output outputting the correlated signal. In one or more examples, the correlation comprises a value greater than a threshold value indicating the demodulated signal and the one of the de-spreading sequences are correlated. The operation can be repeated for each of the spreading sequences (one spreading sequence for the "1" bit and one spreading sequence for the "0" bit of the message).

Block 808 represents the end result (a system or device). The system or device can be embodied in many ways including, but not limited to, the following. Block 80 represents optionally connecting the receiver in a communications system including the transmitter.

1. A receiver 104, comprising:

an antenna 118 receiving carrier electromagnetic radiation 114 transmitted from a transmitter 102;

a demodulator 120 demodulating the carrier electromagnetic radiation to obtain a demodulated signal 124 comprising a spread signal 111 combined with thermal noise, the thermal noise 126 having a thermal noise power spectral density (PSD), the spread signal formed from a signal 108 having a signal PSD greater than the thermal noise PSD using a spreading sequence 103 applied to the signal in the transmitter, and the spreading sequence spreading a signal bandwidth of the signal 108 to form the spread signal having a spread PSD smaller than the thermal noise PSD for all frequencies in the spread signal; and de-spreading circuitry 122:

comparing the demodulated signal with a plurality of de-spreading sequences 127 representing different timings of the spreading sequence 103 with respect to the demodulated signal 124, to find a correlated signal 130 comprising a correlation between the demodulated signal and one of the de-spreading sequences; and selecting and/or outputting the correlated signal 130 as the signal 108.

2. The receiver of example 1, wherein the receiver selects/generates the different timing of de-spreading sequences and selects the correlated signal as the signal without a detection of the signal prior to input of the demodulated signal to the de-spreading circuitry or prior to the demodulating in the demodulator. The correlated signal automatically represents the correct timing synchronization between the despreading sequence and the demodulated signal comprising the correct instants of time at which to apply the de-spreading sequence to the demodulated signal. As a result, for example, the receiver does not (and does not need to) perform phase-locking on the incoming signal and/or use training preamble sequences to establish timing at the receiver since there is no detectable timing or sequence to "lock" onto because the received signal has a PSD below the thermal noise PSD.

3. The receiver of example 1 or 2, wherein the de-spreading circuitry compares all of the plurality of de-spreading sequences with the demodulated signal in parallel and/or simultaneously, and different timings are selected from a set of, or include, every possible time alignment of the spreading sequence with respect to the demodulated signal such that the de-spreading circuitry selects the correlated signal 130 as the signal 108 without estimating or inferring the timings from a detection of the signal prior to the comparing.

4. The receiver of any of the examples 1-3, wherein the spreading sequence comprises a plurality of chips (a pulse or bit "0" or bit "1") forming a direct-sequence spread spectrum (DSSS) code used in direct-sequence code division multiple access (CDMA) channel access techniques and the signal is an NRZ signal.

5. The receiver of any of the examples 1-4, wherein:

the spreading sequence and the de-spreading sequences each comprise a sequence of n elements Xn, where n is an integer, the de-spreading sequences comprise all n of the possible cyclic permutations of the elements of the spreading sequence by an offset wherein the elements shifted off an end of the sequence are inserted back at a beginning of the sequence, and the plurality of de-spreading sequences comprise a set of n de-spreading sequences such that $i^{th}$ de-spreading sequence in the plurality of de-spreading sequences is a cyclic permutation of the spreading sequence by the offset comprising i elements, where $0 \leq i \leq n$. For a spreading sequence with elements $\{X_1, X_2, X_3, \ldots X_n\}$, a cyclic permutation of one place to the left would yield $\{X_2, X_3, \ldots X_n, X_1\}$ and a cyclic permutation of one place to the right would yield $\{X_n, X_1, X_2 \ldots X_{n-1}\}$. The mapping can be written as $X_i \to X_{i+k}$ (mod n) for a shift (or rotation) of k places.

6. The receiver of any of the examples 1-5, wherein the de-spreading circuit:
multiplies the demodulated signal by each of the de-spreading sequences to form a plurality of outputs 307, and
adds the outputs to form a summed output 308 comprising the correlated signal 130.

7. The receiver of any of the examples 1-6, wherein the de-spreading circuit comprises a plurality of analog mixers 310 connected in parallel, each of them mixers multiplying the de-modulated signal comprising an analog signal with a different one of the de-spreading sequences to form the outputs.

8. The receiver of any of the examples 1-7, wherein the spread PSD has a magnitude smaller than (and the signal PSD has a magnitude greater than) the thermal noise measured/detected in the transmitter, the receiver, in any transmission path between the transmitter and the receiver, or by any unintended eavesdropper, for all frequencies in the signal or spread signal.

9. The receiver of any of the examples 1-8, wherein the demodulator demodulates the carrier electromagnetic radiation received on the antenna using homodyne detection (e.g., direct converter, non-coherent detection) obtaining amplitude of the demodulated signal but losing phase information of demodulated signal and the comparing compares only compares amplitude (not phase) of the demodulated signal with the different timings of the despreading sequences.

10. The receiver of any of the examples 1-9, wherein the carrier electromagnetic radiation comprises millimetre wave electromagnetic radiation having a frequency of at least 30 gigahertz.

11. A communication system 100 (e.g., a data-link) comprising the receiver of any of the examples 1-10 and the transmitter 102 transmitting the carrier electromagnetic radiation to the receiver, the transmitter further comprising:
a spreader modulator 106 modulating the signal with the spreading sequence to form the spread signal; and
a carrier modulator 110 modulating a carrier 112 with the spread signal to form the carrier electromagnetic radiation 114.

12. The receiver of any of the examples 1-11, wherein the signal bandwidth is less than 100 KHz and the spread bandwidth is at least 1 GHz.

13. The receiver of any of the examples 1-12, wherein the factor by which the signal bandwidth is spread to form the spread bandwidth is proportional to the data rate of the signal (the data rate is proportional to the spread of the signal bandwidth).

14. The receiver of any of the examples 1-13, wherein the signal comprises a message having a data rate up to 100000 bits per second.

15. The receiver of any of the examples 1-14, further comprising the transmitter including an amplifier amplifying at least one of the spread signal or the carrier electromagnetic radiation by a factor (e.g., amplifying the carrier electromagnetic radiation to watt level powers) sufficient to support transmission of the data rate between 10000 bits per second and 100000 bits per second to the receiver and so that the de-spreading circuitry obtains the correlated signal.

16. The receiver of any of the examples 1-15, wherein the carrier electromagnetic radiation is transmitted wirelessly over a distance of less, than 1 meter, at least 2 meters, in a range of 1 meter-100 Kilometres, between the transmitter and the receiver, depending on the data rate.

17. The system of any of the examples 1-16, comprising a cryptographic system wherein the signal comprises a message and the spreading sequence comprises a key encrypting the message and the spread signal comprises an encrypted message.

18. The system of example 17, wherein the transmitter transmits the key to (or shares the key with) the receiver and the encrypted message cannot be decrypted by the receiver or an eavesdropper without the key.

19. The system of any of the examples 1-18, wherein the system comprises a wireless payment system and the message signal comprises payment information including a bank account number.

20. The system of any of the examples 1-19, wherein the system comprises a text messaging system and the message signal comprises a text message.

21. An integrated circuit or chip 400, comprising:
an input configured to receive a noisy signal comprising a spread signal combined with thermal noise, the thermal noise having a thermal noise power spectral density (PSD), the spread signal formed from a signal having a signal PSD greater than the thermal noise PSD using a spreading sequence applied to the signal, and the spreading sequence spreading a signal bandwidth of the signal to form the spread signal having a spread PSD smaller than the thermal noise PSD for all frequencies in the spread signal; and
de-spreading circuitry comparing the demodulated signal with a plurality of de-spreading sequences, wherein:
the spreading sequence and the de-spreading sequences each comprise a sequence of n elements, where n is an integer,
the de-spreading sequences comprise all n of the possible cyclic permutations of the elements of the spreading sequence by an offset wherein the elements shifted off an end of the sequence are inserted back at a beginning of the sequence, and
the plurality of de-spreading sequences comprise a set of n de-spreading sequences such that $i^{th}$ de-spreading sequence in the plurality of de-spreading sequences is a cyclic permutation of the spreading sequence by the offset comprising i elements, where $0 \le i \le n$.

22. The integrated circuit of example 21, wherein the comparing comprises:
multiplying the noisy signal by each of the de-spreading sequences to form a plurality of outputs, and
adding the outputs to form a summed output comprising the correlated signal.

23. The integrated circuit of example 21 or 22, wherein the de-spreading circuit comprises a plurality of analog mixers connected in parallel, each of them mixers multiplying the noisy signal comprising an analog signal with a different one of the de-spreading sequences to form the outputs.

24. The receiver, integrated circuit, or method of any of the examples, wherein:
the transmitter 102 (spreading modulator 106) applies the spreading sequence 103 to the signal with a first timing 115 (e.g., clock rate or clock cycle) determined by a first clock 117 in the transmitter 102, and
the de-spreading circuit 122 compares all of the de-spreading sequences 127 to the de-modulated signal using a second timing 129 (e.g., clock rate or clock cycle) determined by a second clock 131 in the receiver.

25. The receiver, integrated circuit, or method of example 24, wherein the first clock 117 and the second clock 131 drift relative to one another so that the first timing 115 is different (e.g., has a different rate) and/or is not synchronized with the second timing 129.

Method of Communicating

Figure 9:
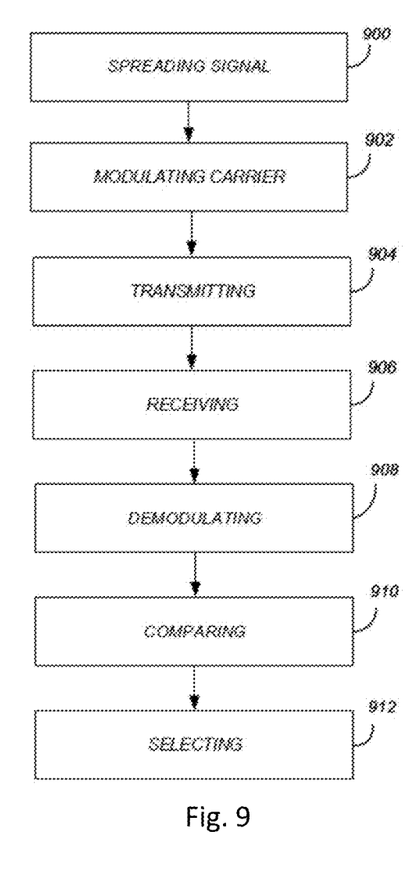
FIG. 9. Flowchart illustrating a method of communicating.

FIG. 9 illustrates a method of communicating, comprising the following steps.

Block 900 represents spreading (e.g., modulating) a signal, comprising a message and a signal bandwidth, with a spreading sequence spreading the signal bandwidth to form a spread signal having a spread bandwidth.

Block 902 represents modulating a carrier with the spread signal to form a carrier electromagnetic radiation.

Block 904 represents transmitting the carrier electromagnetic radiation to a receiver.

Block 906 represents receiving the carrier electromagnetic radiation in the receiver.

Block 908 represents demodulating the carrier electromagnetic radiation in the receiver to obtain a demodulated signal comprising the spread signal combined with thermal noise, the thermal noise having a thermal noise power spectral density (PSD) and the spread signal having a spread PSD below the thermal noise PSD.

Block 910 represents comparing the demodulated signal with a plurality of de-spreading sequences representing different timings of the spreading sequence with respect to the demodulated signal, to find a correlated signal comprising a correlation between the demodulated signal and one of the de-spreading sequences. In various examples, the correlation represents the timing synchronization comprising the correct instants of time at which to apply the de-spreading sequence to the demodulated signal.

Block 912 represents selecting and/or outputting the correlated signal as the signal comprising the message transmitted from the transmitter and having a signal PSD greater than the thermal noise PSD. In one example, the step comprises selecting the correlated signal as the signal using only the spreading sequence and a set of every possible time alignment of the spreading sequence with respect to the demodulated signal generated without estimating or inferring the timings from a detection of the signal prior to the comparing.

The method can be implemented using the device of any of the examples described herein.

Advantages and Improvements

The present invention uses the wideband properties of millimeter-wave signals to produce a spread spectrum signal that is transmitted and received below the thermal noise floor of the environment. Embodiments of the present invention have several important properties.

(1) No instrumentation or sensors except the intended receiver (with the "spreading code") can detect the transmission is physically present, because the system operates below the background noise of the environment. The communication is truly invisible to those that are not intended receivers.

(2) This typically means un-intended receivers cannot gain access to the content of a transmitted message or dataset.

(3) The data link produces no radio frequency interference (RFI) on nearby systems or devices because its emission levels are below the natural background of the environment.

The present invention repurposes the concept of spread spectrum [8] used at microwave frequencies but extends them to the millimeter-wavelengths where even larger spreading factors are possible. The invention can be embodied many different ways, but in general contains a transmitter or receiver operating at millimeter or sub-millimeter wave frequencies. The transmitter contains a spreading engine that takes in a narrow band or "low-data-rate" signal and spreads its energy across a large bandwidth. The spreading occurs to such a high factor (defined as [spread bandwidth/unspread bandwidth]) that the resulting emission is below the thermal noise floor of the environment, at whatever temperature it exists.

Within the receiver, a de-spreading device converts the wideband spread signal from the transmitter back into a narrowband signal, restoring its signal power density well above the thermal floor allowing detection (de-spreading). Unique to this invention is how timing is extracted. In order to de-spread a signal in a conventional spread spectrum link one must have timing information to align the de-spreading process in time with the received spread signal. This is typically done through a training sequence or preamble that the receiver uses to infer the timing of the transmitted spread signal in order to facilitate the de-spread process (i.e., a regular receiver sees or observes the signal first before demodulating, estimates the time alignment from that observation, and demodulates at that time alignment.

However, in the present invention, the received signal is below the thermal floor and so no timing information can be inferred prior to de-spreading. Instead the present invention uses a new structure called a "cyclic-de-spreader" which simultaneously tries to de-spread the received signal in all possible time-alignments and then combines these parallel results in a process of correlated summation which leaves only the de-spread waveform as an output.

In a traditional spread spectrum link, the de-spreading process is completed in the digital domain after an analog-to-digital converter (ADC) has transformed a received signal. Owing to the large bandwidths involved and the difficulties associated with processing them efficiently, our invention performs the de-spreading process in the analog domain with a large array of parallel mixer/multiplier circuits.

REFERENCES

The following references are incorporated by reference herein.

[1] Y. Kim, B. Hu, Y. Du, W-H Cho, R. Huang, A Tang, H-N Chen, C. P. Jou, J. Cong, T. Itoh, M-C Chang. "A Millimeter-Wave CMOS Transceiver With Digitally Pre-Distorted PAM-4 Modulation for Contactless Communications", IEEE Journal of Solid-State Circuits, vol. 54, no. 6, pp. 1600-1612, June 2019.

[2] Y. Kim, B. Hu, Y. Du, W-H Cho, R. Huang, A Tang, H-N Chen, C. P. Jou, J. Cong, T. Itoh, M-C Chang. "A Millimeter-Wave CMOS Transceiver With Digitally Pre-Distorted PAM-4 Modulation for Contactless Communications", IEEE Journal of Solid-State Circuits, vol. 54, no. 6, pp. 1600-1612, June 2019.

[3] U. Kodak and G. M. Rebeiz, "A 5G 28-GHz Common-Leg T/R Front-End in 45-nm CMOS SOI With 3.7-dB NF and −30-dBc EVM With 64-QAM/500-MBaud Modulation," in IEEE Transactions on Microwave Theory and Techniques, vol. 67, no. 1, pp. 318-331, January 2019.

[4] R. Wu et al., "64-QAM 60-GHz CMOS Transceivers for IEEE 802.11ad/ay," in IEEE Journal of Solid-State Circuits, vol. 52, no. 11, pp. 2871-2891, November 2017.

[5] Deacon J. Nemchick, Brian J. Drouin Adrian J. Tang, Yanghyo Kim, Mau-Chung Frank Chang, "Sub-Doppler Spectroscopy With a CMOS Transmitter", in IEEE Transactions on Terahertz Science and Technology, vol. 8, no. 1, pp. 121-126Deacon J. Nemchick, Brian J. Drouin Adrian J. Tang, Yanghyo Kim, Gabriel Virbila, Mau-Chung Frank Chang, "A CMOS-Based 90-105 GHz Pulsed-Echo Spectrometer: New Approaches for Highly-Mobile and Low-Power in situ Chemical Detections", IEEE International Symposium on Space Terahertz Technology (ISSTT) 2018.

[6] A. Tang, Y. Kim, T. Reck, Y. Tang, Y. Xu, G. Chattopadhyay, B. Drouin, M. Mehdi, M-C F. Chang, "A 177-205 GHz 249 mW CMOS-Based Integer-N Frequency Synthesizer Module for Planetary Exploration," in IEEE Transactions on Terahertz Science and Technology, vol. 8, no. 2, pp. 1-4

[7] A. Tang, T. Reck, R. Shu, L. Samoska, Yangyho Kim Y. Ye, Q. Gu, B. J. Drouin, J. Truettel, R. Al Hadi, Y. Xu, S. Sarkozy, R. Lai, M-C Chang Imran Mehdi, "A W-Band 65 nm CMOS/InP-Hybrid Radiometer Passive Imager", International Microwave Symposium 2016.

[8] Don Torrieri, "Principles of Spread-Spectrum Communication Systems", Springer, 2015 ISBN 978-3-319-14095-7

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A receiver, comprising:
an antenna receiving carrier electromagnetic radiation transmitted from a transmitter;
a demodulator demodulating the carrier electromagnetic radiation to obtain a demodulated signal comprising a spread signal combined with thermal noise, the thermal noise having a thermal noise power spectral density (PSD), the spread signal formed from a signal using a spreading sequence applied to the signal in the transmitter, and the spreading sequence spreading a signal bandwidth of the signal to form the spread signal having a spread PSD smaller than the thermal noise PSD for all frequencies in the spread signal; and
de-spreading circuitry:
comparing the demodulated signal with a plurality of de-spreading sequences representing different timings of the spreading sequence with respect to the demodulated signal, to obtain a correlated signal comprising a correlation between the demodulated signal and one of the de-spreading sequences even if the de-spreading sequences are applied to the demodulated signal using a second clock that is not synchronized to a first clock in the transmitter, the first clock used to apply the spreading sequence to the signal; and
outputting the correlated signal as the signal having a signal PSD greater than the thermal noise PSD.

2. The receiver of claim 1, wherein:
the de-spreading circuitry compares all of the plurality of de-spreading sequences with the demodulated signal in parallel or simultaneously, and
the different timings are selected from a set of, or include, every possible time alignment of the spreading sequence with respect to the demodulated signal.

3. The receiver of claim 1, wherein:
the spreading sequence and the de-spreading sequences each comprise a sequence of n elements, where n is an integer,
the de-spreading sequences comprise all n of the possible cyclic permutations of the elements of the spreading sequence by an offset wherein the elements shifted off an end of the sequence are inserted back at a beginning of the sequence, and
the plurality of de-spreading sequences comprise a set of n de-spreading sequences such that $i^{th}$ de-spreading sequence in the plurality of de-spreading sequences is a cyclic permutation of the spreading sequence by the offset comprising i elements, where $0 \leq i \leq n$.

4. The receiver of claim 3, wherein the de-spreading circuitry:
multiplies the demodulated signal by each of the de-spreading sequences in parallel to form a plurality of outputs, and
adds the outputs to form a summed output comprising the correlated signal.

5. The receiver of claim 3, wherein the de-spreading circuitry comprises a plurality of analog mixers connected in parallel, each of them mixers multiplying the de-modulated signal comprising an analog signal with a different one of the de-spreading sequences to form outputs.

6. The receiver of claim 1, wherein:
the demodulator demodulates the carrier electromagnetic radiation received on the antenna using direct non-coherent detection, obtaining amplitude of the demodulated signal but losing phase information of demodulated signal, and
the comparing compares only amplitude (not phase) of the demodulated signal with the different timings of the de-spreading sequences.

7. The receiver of claim 1, wherein the carrier electromagnetic radiation comprises millimetre wave electromagnetic radiation having a frequency of at least 30 gigahertz.

8. A communication system comprising the receiver of claim 1 and the transmitter transmitting the carrier electromagnetic radiation to the receiver, the transmitter further comprising:
a spreading modulator modulating the signal with the spreading sequence to form the spread signal; and
a carrier modulator modulating a carrier with the spread signal to form the carrier electromagnetic radiation.

9. The system of claim 8, wherein the signal bandwidth is less than 100 KHz and the spread bandwidth is at least 1 GHz.

10. The system of claim 8, wherein the signal comprises a message having a data rate up to 100000 bits per second.

11. The system of claim 8, further comprising the transmitter including an amplifier amplifying at least one of the spread signal or the carrier electromagnetic radiation by a factor sufficient to support transmission of a data rate between 10000 bits per second and 100000 bits per second to the receiver and so that the de-spreading circuitry obtains the correlated signal.

12. The system of claim 8, comprising a cryptographic system wherein the signal comprises a message and the spreading sequence comprises a key encrypting the message and the spread signal comprises an encrypted message.

13. The system of claim 12, wherein the transmitter transmits the key to the receiver and the encrypted message cannot be decrypted by the receiver or an eavesdropper without the key.

14. The system of claim 8, wherein the system comprises a wireless payment system and the signal comprises a message signal comprising payment information including a bank account number.

15. The system of claim 8, wherein the system comprises a text messaging system and the signal comprises a message signal comprising a text message.

16. The receiver of claim 1, wherein the different timings are selected from a set of, or include, every possible time alignment of the spreading sequence with respect to the demodulated signal such that the de-spreading circuitry selects the correlated signal as the signal without knowledge of the timings obtained from:
a training sequence, or
a detection or observation of the carrier electromagnetic radiation in the receiver prior to the demodulating or prior to the comparing.

17. A method of communicating, comprising:
modulating a signal, comprising a message and a signal bandwidth, with a spreading sequence spreading the signal bandwidth to form a spread signal having a spread bandwidth;
modulating a carrier with the spread signal to form a carrier electromagnetic radiation;
transmitting the carrier electromagnetic radiation to a receiver;
demodulating the carrier electromagnetic radiation in the receiver to obtain a demodulated signal comprising the spread signal combined with thermal noise, the thermal noise having a thermal noise power spectral density (PSD) and the spread signal having a spread PSD below the thermal noise PSD; and
comparing the demodulated signal with a plurality of de-spreading sequences representing different timings selected from a set comprising every possible time alignment of the spreading sequence with respect to the demodulated signal, to find a correlated signal comprising a correlation between the demodulated signal and one of the de-spreading sequences; and
selecting the correlated signal as the signal comprising message transmitted from the transmitter and having a signal PSD greater than the thermal noise PSD.

18. An integrated circuit, comprising:
an input configured to receive a noisy signal comprising a spread signal combined with thermal noise, the thermal noise having a thermal noise power spectral density (PSD), the spread signal formed from a signal having a signal PSD greater than the thermal noise PSD using a spreading sequence applied to the signal, and the spreading sequence spreading a signal bandwidth of the signal to form the spread signal having a spread PSD smaller than the thermal noise PSD for all frequencies in the spread signal; and
de-spreading circuitry comparing the noisy signal with a plurality of de-spreading sequences in parallel, wherein:
the spreading sequence and the de-spreading sequences each comprise a sequence of n elements, where n is an integer,
the de-spreading sequences comprise all n of the possible cyclic permutations of the elements of the spreading sequence by an offset wherein the elements shifted off an end of the sequence are inserted back at a beginning of the sequence, and
the plurality of de-spreading sequences comprise a set of n de-spreading sequences such that $i^{th}$ de-spreading sequence in the plurality of de-spreading sequences is a cyclic permutation of the spreading sequence by the offset comprising i elements, where $0 \leq i \leq n$.

19. The integrated circuit of claim 18, wherein the comparing comprises:
multiplying the noisy signal by each of the de-spreading sequences to form a plurality of outputs, and
adding the outputs to form a summed output comprising a correlated signal.

20. The integrated circuit of claim 18, wherein the de-spreading circuitry comprises a plurality of analog mixers connected in parallel, each of them mixers multiplying the noisy signal comprising an analog signal with a different one of the de-spreading sequences to form outputs.

* * * * *